United States Patent
Wittorf et al.

(10) Patent No.: US 8,626,378 B2
(45) Date of Patent: Jan. 7, 2014

(54) METHOD AND DESCRIPTION FOR DETERMINING AND PROVIDING INFORMATION FOR THE TRANSPORT OF AN OBJECT

(75) Inventors: Marten Wittorf, Ingelheim (DE); Sven Wanner, Stadecken-Elsheim (DE)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 13/441,535

(22) Filed: Apr. 6, 2012

(65) Prior Publication Data

US 2012/0259509 A1   Oct. 11, 2012

(30) Foreign Application Priority Data

Apr. 9, 2011   (DE) .................. 10 2011 016 641

(51) Int. Cl.
*G06F 19/00* (2011.01)
(52) U.S. Cl.
USPC ........ 701/34.4; 701/34.2; 701/29.6; 701/33.2
(58) Field of Classification Search
USPC .............................. 701/34.4, 29.6, 33.2, 34.2
See application file for complete search history.

(56) References Cited

U.S. PATENT DOCUMENTS

| | | | |
|---|---|---|---|
| 2001/0041948 A1 | 11/2001 | Ross et al. | |
| 2007/0265754 A1 * | 11/2007 | Curtis et al. | 701/49 |
| 2011/0078182 A1 * | 3/2011 | Fenyes et al. | 707/770 |

FOREIGN PATENT DOCUMENTS

| | | |
|---|---|---|
| DE | 10334708 A1 | 2/2005 |
| DE | 10334708 A1 * | 2/2005 |
| DE | 102005001480 B3 | 10/2006 |
| GB | 2383231 A | 6/2003 |
| JP | 58006841 | 1/1983 |
| JP | 2010198205 A | 9/2010 |
| WO | 02066345 A1 | 8/2002 |

OTHER PUBLICATIONS

German Patent Office, German Search Report dated Aug. 5, 2011 for German Application No. 102011016641.6.

* cited by examiner

*Primary Examiner* — Mary Cheung
*Assistant Examiner* — Brian P Sweeney
(74) *Attorney, Agent, or Firm* — Ingrassia Fisher & Lorenz, P.C.

(57) ABSTRACT

A method is provided for determining and providing information for the transport of an object with a passenger car. A determining of the first parameter of the object to be transported takes place, where the at least one first parameter is selected from the group consisting of dimensions of the object and the mass of the object. In addition, a determining of a current transport capacity of the passenger car takes place. Furthermore, a determining of a probable loading state of the passenger car based on the determined first parameter and the determined current transport capacity of the passenger car takes place. In addition, an outputting of information regarding the determined probable loading state takes place.

21 Claims, 8 Drawing Sheets

METHOD AND DESCRIPTION FOR DETERMINING AND PROVIDING INFORMATION FOR THE TRANSPORT OF AN OBJECT

CROSS-REFERENCE TO RELATED APPLICATION

This application claims priority to German Patent Application No. DE 10 2011 016 641.6, filed Apr. 9, 2011, which is incorporated herein by reference in its entirety.

TECHNICAL FIELD

The technical field relates to a method and a device for determining and providing information for the transport of at least one object with a passenger car, a computer program product and a computer-readable medium.

BACKGROUND

During a transport of objects with a passenger car, some people tend to overestimate the load or transport capacity of the vehicle, for example, while shopping. Therefore, it is possible that too many objects are bought. Arriving at the passenger car, difficulties can subsequently arise with the loading of the passenger car. This can be augmented in that typically no additional transport aids such as for example fastening straps are carried along in the vehicle or the loading cannot be carried out by one person alone. It can happen, furthermore, that shopping trolleys start moving in an uncontrolled manner or the parking lock, in which the motor vehicle is parked, is too narrow for the loading process. In addition, the loading can sometimes comprise a plurality of loading steps and the loading process can thus take more time than expected. Large objects are often temporarily leaned against the side walls of the motor vehicle during the transport, which could lead to damages and sometimes the transport goods are stowed in such a way that they cause a possible risk during the trip.

Therefore, at least one object is to state a method and a device for determining and providing information for the transport of at least one object with a passenger car, a computer program product and a computer-readable medium, which support customers or users during a shopping process. In addition, other objects, desirable features and characteristics will become apparent from the subsequent summary and detailed description, and the appended claims, taken in conjunction with the accompanying drawings and this background.

SUMMARY

According to an embodiment, a method for determining and providing information for the transport of at least one object by means of a passenger car comprises the following steps. There takes place a determining of at least one first parameter of at least one object to be transported. The at least one first parameter in this case is selected from the group consisting of dimensions of the at least one object and the mass of the at least one object. In addition, a determining of a current transport capacity of the passenger car takes place. Furthermore, a determining of a probable loading state of the passenger car based on the at least one determined first parameter and the determined current transport capacity of the passenger car takes place. Furthermore, an outputting of information with regard to the determined probable loading state takes place.

The method supports customers or users, for example, the driver of the passenger car, during a shopping process. In particular, this takes place through the determining of the probable loading state of the passenger car based on the mentioned quantities and the outputting of information regarding this determined probable loading state. Therefore, the user receives, even during the shopping process, information as to whether the passenger car is suitable for the transport of the at least one object and can therefore already determine at an early stage if he should make the purchase. The method thus has the advantage that the user cannot only determine during a loading process if the object to be transport is suitable for the transport with the passenger car or not. This results in a time and cost saving to the user, since for example a return transport of the object into the sales localities and a returning process connected with this can be omitted.

The outputting of the information regarding the determined probable loading state preferably includes an outputting of a warning message, if the determined probable loading state exceeds a predetermined threshold value. For example, an outputting of a warning message can take place in the event that the determined probable loading state exceeds the permissible gross weight of the passenger car and/or in the event that a predefined transport volume is exceeded. Therefore, the user is informed in a particularly reliable manner regarding a possible overloading of the passenger car. The warning message can for example be output as a visual and/or acoustic warning message.

In a further embodiment, at least one second parameter characterizing a stackability of the at least one object is additionally determined. The determining of the probable loading state of the passenger car in this embodiment additionally takes place based on the at least one determined second parameter. This is advantageous, in particular, if a plurality of objects have to be transported and the stackability of the individual objects is therefore of particular significance. The at least one second parameter is preferably a packaging state of the at least one object. For example, it can be determined if the packaging is solid or loose or if the at least one object comprises a packaging. Furthermore it can be determined for example if the at least one object is particularly fragile.

The determining the at least one first parameter and/or the at least one second parameter can include an inputting of the at least one first parameter or the at least one second parameter with an input device. This makes possible a particularly simple input of the relevant parameter. Furthermore, the determining of the at least one first parameter and/or of the at least one second parameter can include a providing of an object-specific identification. Here, a selecting of a data set including the at least one first parameter or the at least one second parameter from a data base based on the object-specific identification additionally takes place. The object-specific identification preferably includes an at least one-dimensional barcode and/or an RFID-code. This makes possible a particularly user-friendly determining of the respective parameter.

In addition, the determining of the at least one first parameter and/or of the at least one second parameter can take place by means of data determined by at least one sensor. In an embodiment, the at least one sensor in this case is embodied as optical camera. This likewise makes possible a particularly user-friendly determining of the relevant parameter.

The determining of the current transport capacity of the passenger car preferably includes a determining of a vehicle type of the passenger car, a number of occupants of the passenger car, a current configuration of an interior of the passenger car, a current loading state of the passenger car and/or a determining of transport devices additionally arranged in the region of the passenger car exterior, for example of a bicycle carrier or roof luggage rack. Therefore, the current transport capacity of the passenger car can be determined to as accurate a degree as possible.

In a further embodiment, the determining of the current transport capacity of the passenger car additionally takes place based on at least one predefined parameter. The at least one predefined parameter characterizes the visual conditions for a driver of the passenger car and/or the road safety. The at least one predefined parameter is, for example, a stowage space defined taking into account the visual conditions for the driver or a loading volume taking into account the visual conditions. Therefore, the safety during the transport of the at least one object can be increased and if applicable, legal regulations that exist, taken into account.

The determining of the probable loading state of the passenger car preferably includes a determining of an arrangement of the at least one object to be transported in the passenger car and/or a configuration of the interior of the passenger car based on the determined current transport capacity. The outputting of the information regarding the determined probable loading state in this case includes an outputting of information regarding the determined arrangement of the at least one object to be transported in the passenger car and/or the determined configuration of the interior of the passenger car. Therefore, the user is advantageously provided with detailed information, as a result of which the user can for example stow an object to be transported in a particularly space-saving manner or configure the interior of the passenger car particularly suitable for the transport, for example, by folding over one or a plurality of seats.

A device is provided for determining and providing information for the transport of at least one object with a passenger car. The device comprises a first determining device, embodied for determining at least one first parameter of at least one object to be transported, where the at least one first parameter is selected from the group consisting of dimensions of the at least one object and the mass of the at least one object. In addition, the device comprises a second determining device, embodied for determining a current transport capacity of the passenger car. Furthermore, the device comprises a third determining device, which is embodied for determining a probable loading state of the passenger car based on the at least one determined first parameter and the determined current transport capacity of the passenger car. In addition to this, the device comprises an output device, which is embodied for outputting information regarding the determined probable loading state.

The device has advantages such as the advantages already mentioned in connection with the method, which at this point need not be mentioned again to avoid repetitions. Preferably, the device is part of a mobile telephone. This advantageously increases the comfort for the user, since the user can make use of his mobile telephone and no additional components are therefore needed during the shopping process.

A computer program product which, when it is executed on a computer unit of a device for determining and providing information for the transport of at least one object with a passenger car, directs the computer unit to execute the following steps. The computer unit is directed for determining at least one first parameter of at least one object to be transported, where the at least one first parameter is selected from the group consisting of dimensions of the at least one object and the mass of the at least one object. In addition, the computer unit is directed for determining a current transport capacity of the passenger car. Furthermore, the computer unit is directed for determining a probable loading state of the passenger car based on the at least one determined first parameter and the determined current transport capacity of the passenger car. In addition, the computer unit is directed to output information regarding the determined probable loading state. A computer-readable medium is also provided, on which a computer program product according to the mentioned embodiment is stored. The computer program product and the computer-readable medium have advantages, such as the advantages already mentioned in connection with the method, which at this point are not mentioned again to avoid repetitions.

In addition, other objects, desirable features and characteristics will become apparent from the subsequent summary and detailed description, and the appended claims, taken in conjunction with the accompanying drawings and this background.

BRIEF DESCRIPTION OF THE DRAWINGS

The present invention will hereinafter be described in conjunction with the following drawing figures, wherein like numerals denote like elements, and.

DETAILED DESCRIPTION

The following detailed description is merely exemplary in nature and is not intended to limit application and uses. Furthermore, there is no intention to be bound by any theory presented in the preceding background or summary or the following detailed description.

Figure 1:
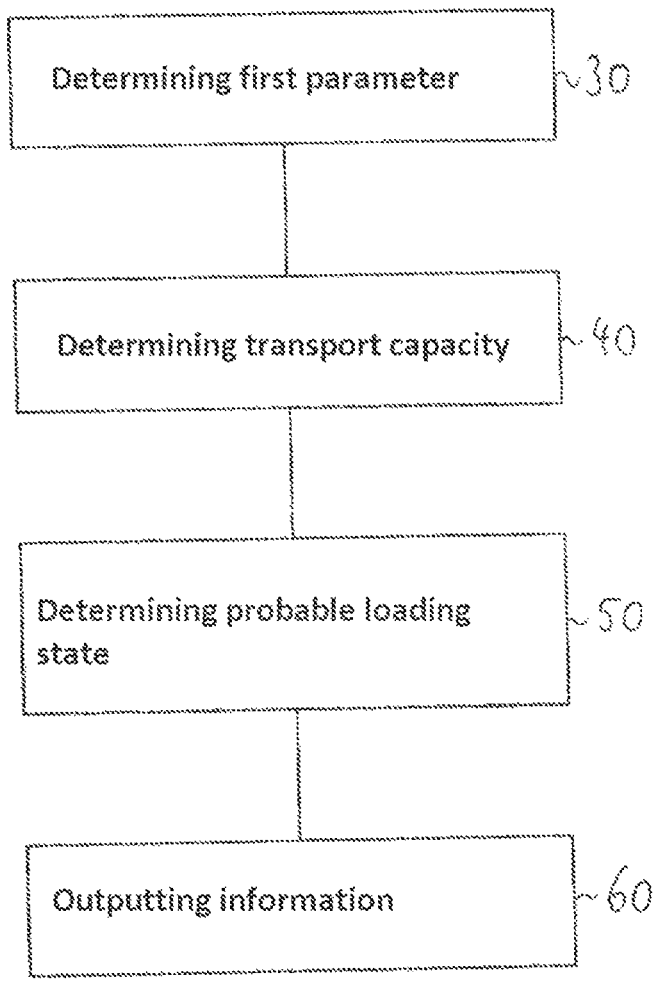
FIG. 1 shows a flow diagram of a method for determining and providing information for the transport of at least one object with a passenger car according to a first embodiment.

FIG. 1 shows a flow diagram of a method for determining and providing information for the transport of at least one object by means of a passenger car according to a first embodiment of the application. In the shown embodiment, a determining of at least one first parameter of at least one object to be transported takes place in a step 30, wherein the at least one first parameter is selected from the group consisting of dimensions of the at least one object and the mass of the at least one object.

The determining of the at least one first parameter in this case can include an inputting of the at least one first parameter by means of an input device, for example a touch screen or touch pad. Furthermore, the determining of the at least one first parameter can include a providing of an object-specific identification and a selecting of a data set including at least one first parameter from a data base based on the object-specific identification. The object-specific identification, for example, includes an at least one-dimensional barcode and/or an RFID-code. Furthermore, the object-specific identification can, for example, be taken from a till slip through a text recognition. In addition, it is possible to determine the object-specific identification immediately during a payment process carried out with a mobile telephone.

In addition, the determining of the at least one first parameter can take place by means of data determined by at least one sensor. The at least one sensor in this case is preferably embodied as optical camera. The dimensions of the at least one object and thus the volume of the at least one object can be determined at least approximately, for example, through evaluating two images of said object taken in different positions.

In a step 40, a determining of a current transport capacity of the passenger car additionally takes place. The determining of the current transport capacity of the passenger car in this case can include a determining of a vehicle type of the passenger car, a number of occupants of the passenger car, a current configuration of an interior of the passenger car, for example, a current arrangement of seats of the passenger car, a current loading state of the passenger car and/or a determining of transport devices additionally arranged in the region of the passenger car exterior. The determining of the mentioned parameters takes place for example by inputting the respective parameter with an input device, for example, by the driver of the passenger car.

Furthermore, the determining of the current transport capacity of the passenger car can additionally take place based on at least one predefined parameter, where the at least one predefined parameter characterizes the visual conditions for a driver of the passenger car and/or the road safety. The at least one predefined parameter can be adjustable by an occupant of the passenger car, in particular the driver of the passenger car. The determining of the current transport capacity in this case can also be carried out before the determining of the at least one first parameter, i.e. the steps 30 and 40 can be switched in their sequence. In a step 50, a determining of a probable loading state of the passenger car based on the at least one determined first parameter and the determined current transport capacity of the passenger car takes place. Furthermore, in a step 60, information regarding the determined probable loading state is output, for example by means of an acoustic and/or visual output device.

Figure 2:
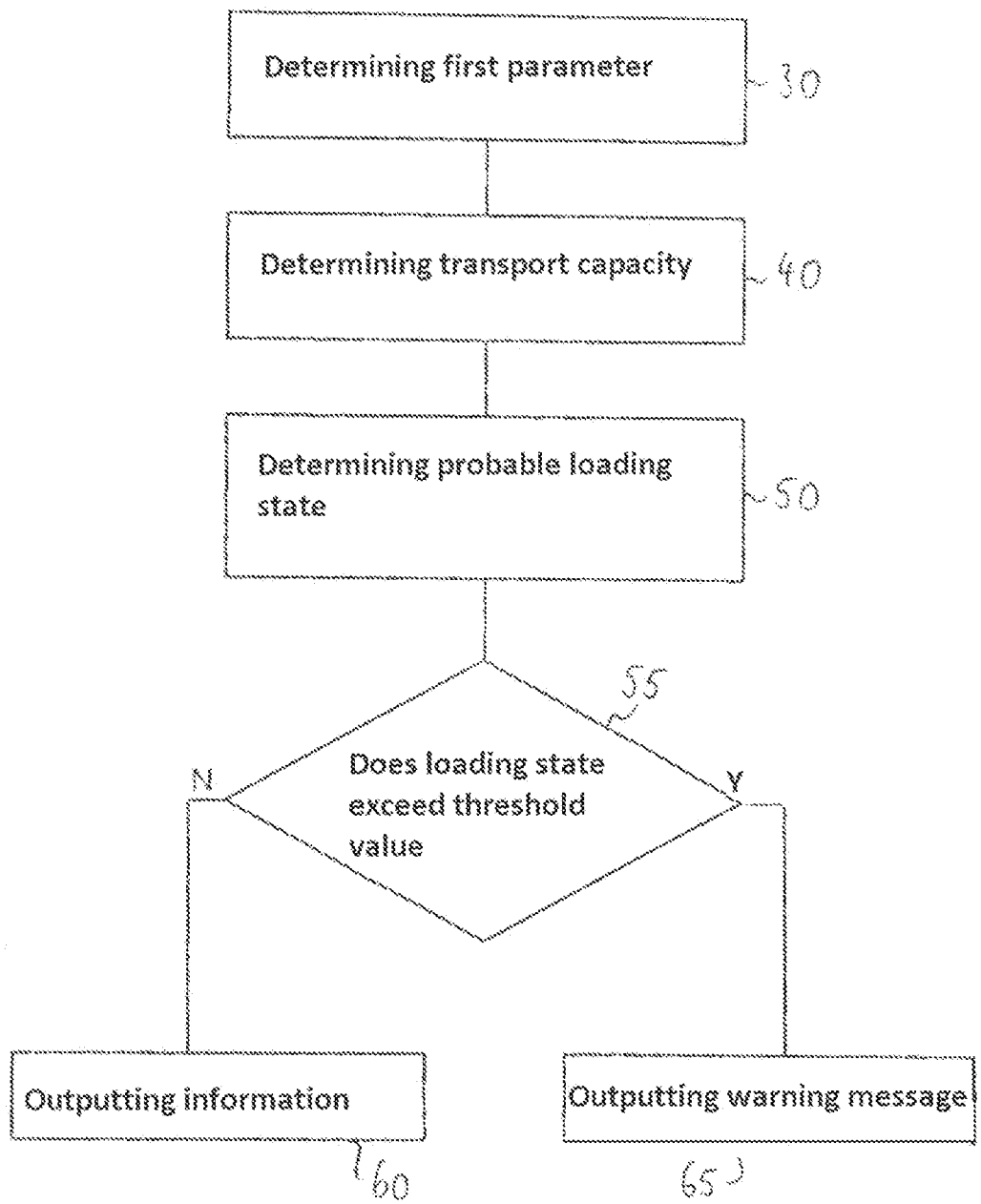
FIG. 2 shows a flow diagram of a method for determining and providing information for the transport of at least one object with a passenger car according to a second embodiment.

FIG. 2 shows a flow diagram of a method for determining and providing information for the transport of at least one object with a passenger car according to a second embodiment. In a step 30, a determining of at least one first parameter of at least one object to be transported and in a step 40 a determining of a current transport capacity of the passenger car corresponding to the steps 30 and 40 of the first embodiment shown in FIG. 1 takes place. Furthermore, in a step 50 a probable loading state of the passenger car based on the at least one determined parameter and the determined current transport capacity of the passenger car is determined This likewise takes place in accordance with the step 50 of the first embodiment shown in FIG. 1.

In a step 55, it is determined in the shown second embodiment, if the determined probable loading state exceeds a predefined threshold value. It is determined for example if the probable loading state exceeds a maximum transport capacity and/or a permissible gross weight of the passenger car. If it is determined in the step 55 that the probable loading state does not exceed the predefined threshold value, an outputting of information regarding the determined probable loading state in accordance with the step 60 of the first embodiment shown in FIG. 1 takes place. If it is determined in the step 55 however that the probable loading state exceeds the predefined threshold value, an outputting of a warning message takes place in a step 65, for example an outputting of a visual and/or acoustic warning message. Furthermore, an automatic notification of a hire car branch office can take place in the step 65 in order to dispatch a fitting motor vehicle, for example a transporter, or to prepare a trailer. In the step 65, a corresponding notification to the user can also be output so that said user can decide if a corresponding request is sent to the hire car branch office.

Figure 3:
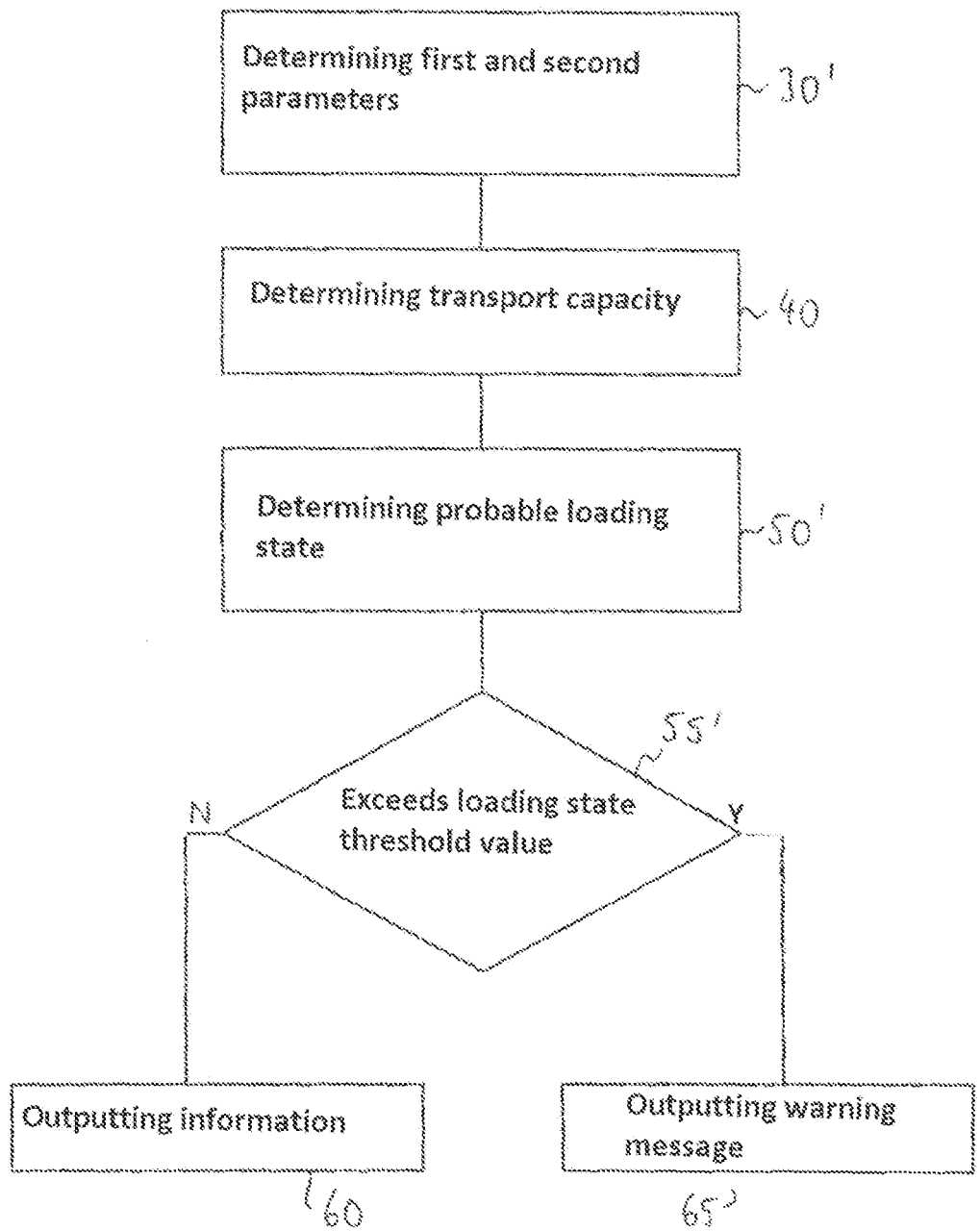
FIG. 3 shows a flow diagram of a method for determining and providing information for the transport of at least one object with a passenger car according to a third embodiment.

FIG. 3 shows a flow diagram of a method for determining and providing information for the transport of at least one object by means of a passenger car according to a third embodiment. In the shown embodiment, a determining of at least one first parameter of at least one object to be transported takes place in a step 30', where the at least one first parameter is selected from the group consisting of dimensions of the at least one object and the mass of the at least one object. In addition, in the step 30', at least one second parameter characterizing a stackability of the at least one object is determined For example, material characteristics of the object to be transported, in particular material characteristics of the object to be transported are determined The determining of the at least one second parameter in this case can include an inputting of the at least one second parameter with an input device. For example, it can be input with the input device if the object is a fragile or a rugged object or the packaging is a solid, stackable or a loose, non-stackable one.

In a step 40, a current transport capacity of the passenger car is determined This takes place in accordance with the step 40 of the first embodiment shown in FIG. 1. In a step 50', a determining of a probable loading state of the passenger car based on the at least one determined first parameter, on the at least one determined second parameter and the determined current transport capacity of the passenger car takes place.

In a step 55', it is determined in the shown embodiment if the probable loading state exceeds a predefined threshold value. In addition, if a plurality of objects is to be transported, it is determined in the step 55' if the probable loading state is suitable with respect to the stackability of the objects. If the probable loading state does not exceed the predefined threshold value or the probable loading state with respect to the stackability of the objects is suitable, an outputting of information regarding the determined probable loading state takes place in a step 60. If, however, the probable loading state exceeds the predefined threshold value or if said loading state is unsuitable with respect to the stackability of the objects, a warning message, for example an acoustic and/or visual warning message is output in a step 65.

Figure 4:
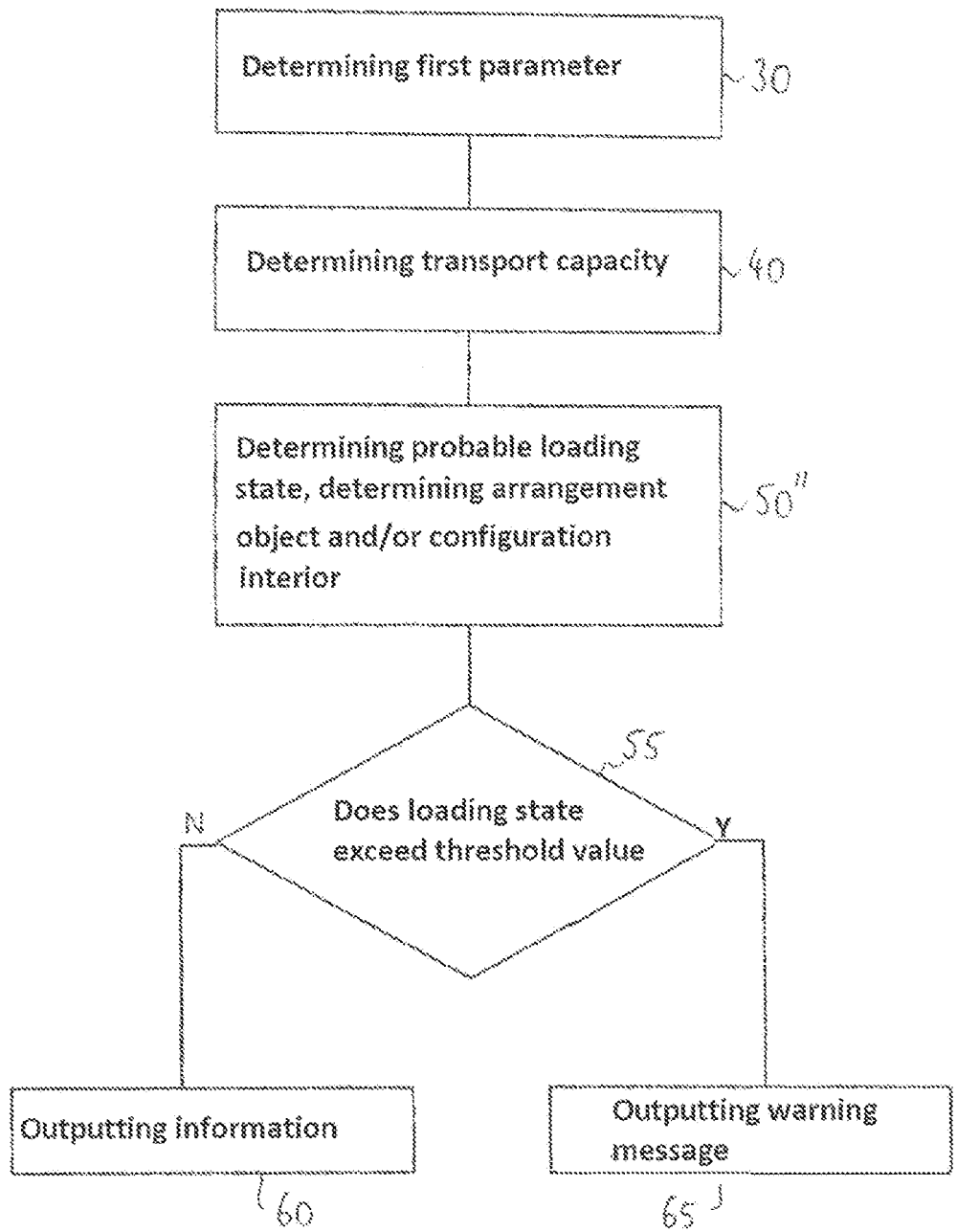
FIG. 4 shows a flow diagram of a method for determining and providing information for the transport of at least one object with a passenger car according to a fourth embodiment.

FIG. 4 shows a flow diagram of a method for determining and providing information for the transport of at least one object with a passenger car according to a fourth embodiment. In a step 30, a determining of at least one first parameter of at least one object to be transported and in a step 40 a determining of a current transport capacity of the passenger car, in accordance with the steps 30 and 40 of the first embodiment shown in FIG. 1 takes place.

In a step 50", a determining of a probable loading state of the passenger car based on the at least one determined first parameter and the determined current transport capacity of the passenger car takes place in the shown embodiment. Here, the determining of the probable loading state of the passenger car in the shown embodiment includes a determining of an arrangement of the at least one object to be transported in the passenger car and/or a configuration of the interior of the passenger car based on the determined current transport capacity. It is thus determined how the object to be transported can be stowed in the passenger car in order to be able to utilize to the highest degree possible the transport capacity of the passenger car or the stowage space that is available or it is determined how the interior of the passenger car can be configured in order to make available as large as possible a stowage space.

In a step 55 it is determined if the probable loading state exceeds a predefined threshold value. This takes place according to the step 55 of the second embodiment shown in FIG. 2. If the probable loading state does not exceed the predefined threshold value, information regarding the determined probable loading state is output in a step 60. In the shown embodiment, the outputting of the information in this case includes an outputting of information regarding the determined arrangement of the at least one object to be transported in the passenger car and/or the determined configuration of the interior of the passenger car. If the probable loading state however exceeds the predefined threshold value, a warning message, for example an acoustic and/or visual warning message is output in a step 65.

The methods shown in the FIG. 1 to FIG. 4 can be carried out for example by means of a computer program product, which is also described as application or "app". The app in this case can be provided by or obtained from a network, for example from the internet. Here, before carrying out the mentioned method, an input configuration or an initial setting-up of the application can be carried out, during which the type of the passenger car and a basic configuration are specified. In addition, accessory parts and additional equipment which simplify or even impair a loading of the passenger car can be specified. Based on these specifications, additional information for an optimization of the basic configuration of the motor vehicle can be output. Following this, the application is ready for use.

Figure 5:
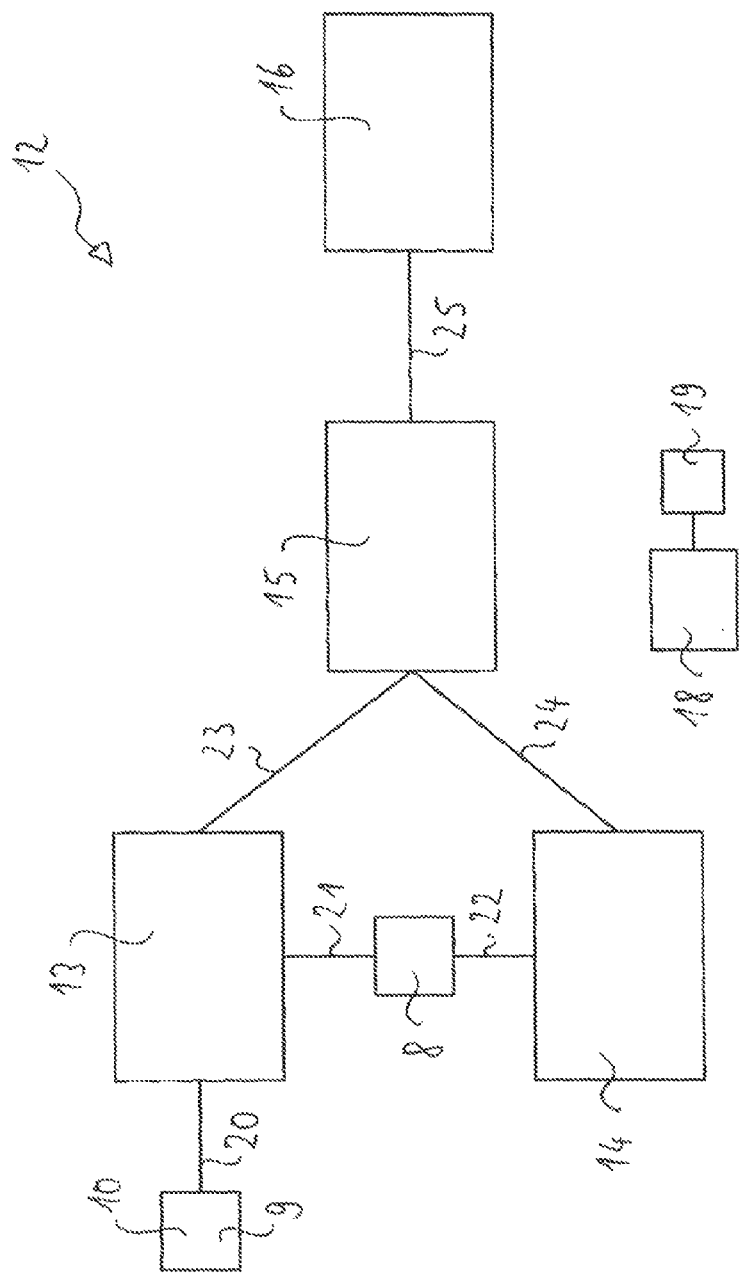
FIG. 5 shows a device for determining and providing information for the transport of at least one object with a passenger car according to an embodiment.

FIG. 5 shows a device 12 for determining and providing information for the transport of at least one object with a passenger car according to an embodiment. The device 12 comprises a first determining device 13, which is embodied for determining at least one first parameter of at least one object to be transported, where the at least one first parameter is selected from the group consisting of dimensions of the at least one object and the mass of the at least one object. In addition, the first determining device 13 in the shown embodiment is embodied for determining at least one second parameter characterizing a stackability of the at least one object.

To this end, the first determining device 13 is connected via a signal line 20 with a sensor 9, which is embodied as optical camera 10. By means of the optical camera 10 a barcode, for example, can be read in, which includes information regarding the dimensions and/or the mass and the stackability of the at least one object or an object-specific identification, by which a data set containing the at least one first parameter or the at least one second parameter can be selected from a data base. Furthermore, the dimensions of the at least one object can be defined with pictures taken by the optical camera 10.

In addition, the first determining device 13 is connected to an input device 8 via a signal line 21. The input device 8 is embodied for example as touch pad or touch screen. Therefore, an inputting of the at least one first parameter or of the at least one second parameter with the input device 8 can take place. The device 12 additionally comprises a second determining device 14, which is embodied for determining a current transport capacity of the passenger car. To this end, the second determining device 14 in the shown embodiment is connected to the input device 8 via a signal line 22, by means of which for example a vehicle type of the passenger car, a number of occupants of the passenger car, a current configuration of the interior of the passenger car and/or a current loading state of the passenger car can be input.

Furthermore, the device 12 comprises a third determining device 15, which is embodied for determining a probable loading state of the passenger car based on the at least one determined first and second parameter and the determined current transport capacity of the passenger car. To this end, the third determining device 15 is connected to the first determining device 13 via a signal line 23 and with the second determining device 14 via a signal line 24. Furthermore, the third determining device 15 is connected via signal line 25 with an output device 16, which is embodied for outputting information regarding the determined probable loading state. The output device 16 is embodied for example as visual and/or acoustic output device.

In addition, the device 12 comprises a computer unit 18 and a computer-readable medium 19, wherein on the computer-readable medium a computer program product is stored which, when it is executed on the computer unit 18, directs the computer unit 18 to execute the steps mentioned in connection with the embodiments of the method according to the application, in particular the steps of the method according to the embodiments shown in the FIG. 1 to FIG. 4 with the elements thereby mentioned. To this end, the computer unit 18 is directly or indirectly connected to the corresponding elements in a manner which is not shown in more detail.

Figure 6A:
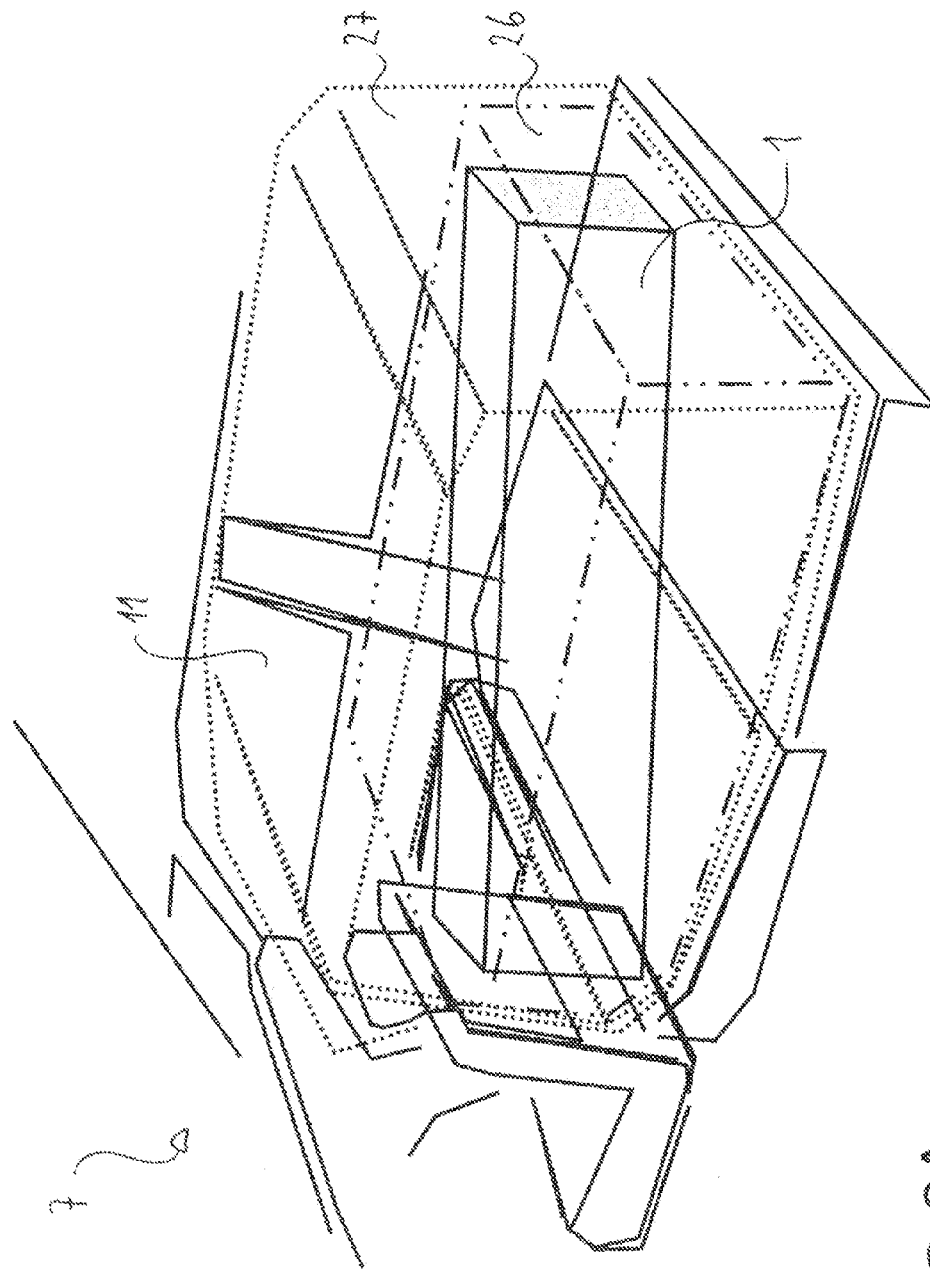
FIG. 6A shows a first example of a situation, in which the method according to an embodiment can be employed.

FIG. 6A shows a first example of a situation in which the method can be employed. To this end, a part region of a passenger car 7 is shown in FIG. 6A. In an interior 11 of the passenger car 7 an object 1 to be transported is shown. Here, merely a driver of the passenger car 7 is present as occupant in the situation shown. The determining of the current transport capacity of the passenger car 7 in the shown situation takes place based on the vehicle type of the passenger car 7, the number of occupants of the passenger car 7 and a current configuration of the interior 11 of the passenger car 7. To this end, a region 27 is shown in FIG. 6A with an interrupted line, which schematically represents the maximally utilizable stowage space. In addition, the determining of the current transport capacity of the passenger car 7 in the shown situation based on a predefined parameter, which characterizes the visual conditions for the driver of the passenger car 7 and road safety aspects, takes place. A region 26 represented by a dash-dotted line in this case schematically represents that stowage space that is recommended with respect to the visual conditions and road safety.

Figure 6B:
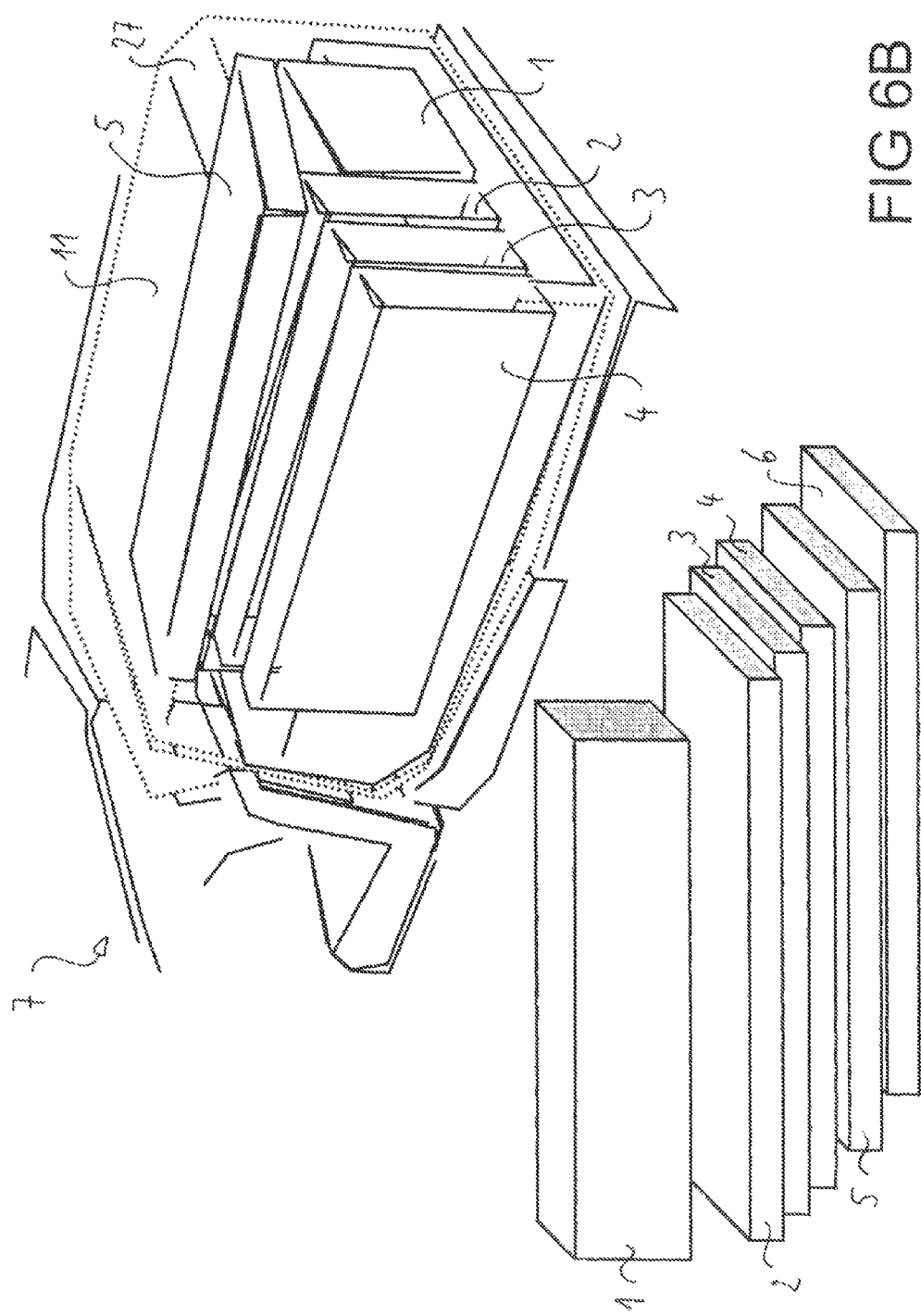
FIG. 6B shows a second example of a situation, in which the method according to an embodiment application can be employed.

FIG. 6B shows a second example of a situation, in which the method can be employed. Components with the same functions as in FIG. 6A are marked with the same reference numbers and are not explained again in the following. In the shown situation it is intended, aside from the object 1, to transport additional objects 2, 3, 4, 5 and 6 by means of the passenger car 7. Based on the determined dimensions of the objects 1 to 6 and the determined current transport capacity of the passenger car 7, a probable loading state of the passenger car 7 is determined Here, the determining of the probable loading state in the shown situation includes a determining of an arrangement of the objects 1 to 6 in the passenger car 7 based on the determined current transport capacity. As is shown in FIG. 6B, the objects 1 to 4 can be arranged in the recommended stowage space in a simple way. The object 5 can be arranged within the region 27, but not within the recommended region. In the situation shown, the object 6 cannot be stowed in the passenger car 7.

Figure 6C:
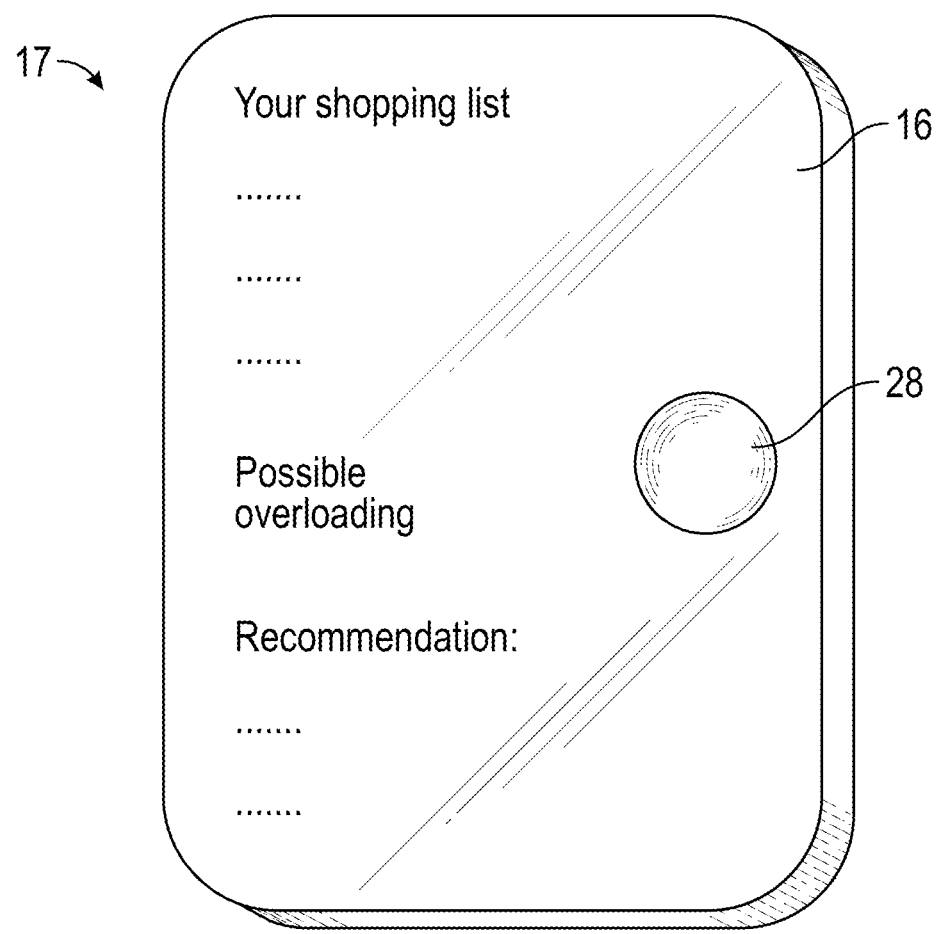
FIG. 6C shows an output device according to an embodiment.

The determined probable loading state is shown to the user. The objects 1 to 6 can be represented in different colors depending on their possible accommodation. For example, the objects 1 to 4 can be shown in green, the objects 5 in yellow and the object 6 in red. To this end, FIG. 6C shows an output device 16 according to an embodiment. The output device 16 in the shown embodiment forms a display of a mobile telephone 17. With the display device 16, the objects to be bought and a possible overloading state are displayed. Here, in the shown embodiment, a region 28 of the display device 16 is visually emphasized, for example, through a red coloring. Furthermore, recommendations regarding the arrangement of the objects to be transported, a configuration of the interior of the passenger car and/or the requesting of a suitable transport vehicle are displayed by means of the display device.

While at least one exemplary embodiment has been presented in the foregoing summary and detailed description, it should be appreciated that a vast number of variations exist. It should also be appreciated that the exemplary embodiment or exemplary embodiments are only examples, and are not intended to limit the scope, applicability, or configuration in any way. Rather, the foregoing summary and detailed description will provide those skilled in the art with a convenient road map for implementing an exemplary embodiment, it being understood that various changes may be made in the function and arrangement of elements described in an exemplary embodiment without departing from the scope as set forth in the appended claims and their legal equivalents.

What is claimed is:

1. A method implemented in a computer unit for determining and providing information regarding transport of at least one object within a passenger car, the method comprising:
   determining a first parameter of an object;
   determining, at the computer unit, a current transport capacity of the passenger car based on inputs comprising: a number of occupants of the passenger car and a current configuration of an interior of the passenger car;
   determining a probable loading state of the passenger car based on the first parameter and the current transport capacity of the passenger car; and
   outputting information regarding the probable loading state.

2. The method according to claim 1, wherein the first parameter is a dimension of the object.

3. The method according to claim 1, wherein the first parameter is a mass of the object.

4. The method according to claim 1, wherein the outputting the information regarding the probable loading state comprises outputting of a warning message if the probable loading state exceeds a predefined threshold value.

5. The method according to claim 1, further comprising determining a second parameter characterizing a stackability of the object,
wherein the determining of the probable loading state of the passenger car additionally takes place based on the second parameter.

6. The method according to claim 1, wherein the determining of the first parameter comprises inputting of the first parameter with an input device.

7. The method according to claim 1, wherein the determining of the first parameter comprises providing of an object-specific identification and selecting of a data set containing the first parameter from a data base based on the object-specific identification.

8. The method according to claim 7, wherein the object-specific identification includes an at least one-dimensional bar code.

9. The method according to claim 7, wherein the object-specific identification includes an RFID-code.

10. The method according to claim 1, wherein the determining of the first parameter takes place with data determined by a sensor.

11. The method according to claim 10, wherein the sensor is an optical camera.

12. The method according to claim 1, wherein the determining of the probable loading state of the passenger car comprises determining of an arrangement of the object to be transported in the passenger car.

13. The method according to claim 1, wherein the step of determining the current transport capacity of the passenger car, comprises:
   determining, at the computer unit, the current transport capacity of the passenger car based on inputs comprising: a vehicle type of the passenger car, the number of occupants of the passenger car, and the current configuration of the interior of the passenger car.

14. The method according to claim 13, wherein the step of determining the current transport capacity of the passenger car, comprises:
   determining, at the computer unit, the current transport capacity of the passenger car based on inputs comprising: the vehicle type of the passenger car, the number of occupants of the passenger car, the current configuration of the interior of the passenger car, and a current loading state of the passenger car.

15. The method according to claim 1, wherein the step of determining the current transport capacity of the passenger car, comprises:
   determining, at the computer unit, the current transport capacity of the passenger car based on inputs comprising: the number of occupants of the passenger car, the current configuration of the interior of the passenger car, and a current loading state of the passenger car.

16. A device for determining and providing information regarding a transport of an object with a passenger car, comprising:
   a first determining device configured to determine a first parameter of the object;
   a second determining device configured to determine a current transport capacity of the passenger car based on inputs comprising: a number of occupants of the passenger car and a current configuration of an interior of the passenger car;
   a third determining device configured to determine a probable loading space of the passenger car based on the first parameter and the current transport capacity of the passenger car; and
   an output device configured to output information regarding a probable loading state.

17. The device according to claim 16, wherein the device is part of a mobile telephone.

18. A non-transitory computer readable medium embodying a computer program product for use with a computer unit, said computer program product comprising:
   a program that when executed by the computer unit is configured to determine and provide information regarding a transport of at least one object with a passenger car, wherein the program is configured to:
   receive inputs;
   determine a first parameter of an object;
   determine a current transport capacity of the passenger car based on the inputs, wherein the inputs comprise: a number of occupants of the passenger car and a current configuration of an interior of the passenger car;
   determine a probable loading state of the passenger car based on the first parameter and the current transport capacity of the passenger car; and
   output information regarding the probable loading state.

19. The non-transitory computer readable medium embodying the computer program product according to claim 18, wherein the first parameter is a dimension of the object.

20. The non-transitory computer readable medium embodying the computer program product according to claim 18, wherein the first parameter is a mass of the object.

21. The non-transitory computer readable medium embodying the computer program product according to claim 18, wherein the outputting the information regarding the probable loading state comprises:
   outputting of a warning message if the probable loading state exceeds a predefined threshold value.

* * * * *